United States Patent
Collins

(10) Patent No.: US 7,106,036 B1
(45) Date of Patent: Sep. 12, 2006

(54) APPARATUS AND METHOD FOR HIGH-FREQUENCY PWM WITH SOFT-START

(75) Inventor: Michael John Collins, Longmont, CO (US)

(73) Assignee: National Semiconductor Corporation, Santa Clara, CA (US)

(*) Notice: Subject to any disclaimer, the term of this patent is extended or adjusted under 35 U.S.C. 154(b) by 262 days.

(21) Appl. No.: 10/881,855

(22) Filed: Jun. 30, 2004

(51) Int. Cl.
*G05F 1/40* (2006.01)
*G05F 1/56* (2006.01)
*H02M 7/10* (2006.01)

(52) U.S. Cl. ...................... 323/282; 323/284
(58) Field of Classification Search ................ 323/238, 323/246, 268, 271, 282, 284–287
See application file for complete search history.

(56) References Cited

U.S. PATENT DOCUMENTS

| | | | | |
|---|---|---|---|---|
| 4,533,863 A | * | 8/1985 | Luhn et al. ............... | 322/28 |
| 4,864,482 A | * | 9/1989 | Quazi et al. .............. | 363/37 |
| 6,160,386 A | * | 12/2000 | Hemena et al. .......... | 323/272 |
| 6,700,763 B1 | * | 3/2004 | Testin ....................... | 361/56 |
| 6,969,977 B1 | * | 11/2005 | Smith ....................... | 323/222 |

OTHER PUBLICATIONS

Maxim Integrated Products, "High-Efficiency, 26V Step-Up Converter for White LED Main and Subdisplay Backlighting", MAX 1582. Apr. 2003, Can be found at www.maxim-ic.com.

* cited by examiner

*Primary Examiner*—Matthew V. Nguyen
(74) *Attorney, Agent, or Firm*—John W. Branch; Darby & Darby PC

(57) ABSTRACT

A boost regulator circuit with soft-start is arranged for high-frequency pulse width modulation of LED current. When a shutdown signal is asserted, all circuitry in the boost regulator circuit is disabled, except for circuitry needed for a shutdown delay timer. Also, when the shutdown signal is asserted, the shutdown delay timer begins. If the shutdown signal is de-asserted before the shutdown delay timer expires, the boost regulator circuit resumes normal operation and soft-start is not employed. If the timer expires before the shutdown signal is de-asserted, a soft-start timer is reset, and the entire boost regulator circuit is disabled. When the shutdown signal is de-asserted after the soft-start timer is reset, soft-start is employed.

20 Claims, 8 Drawing Sheets

APPARATUS AND METHOD FOR HIGH-FREQUENCY PWM WITH SOFT-START

FIELD OF THE INVENTION

The invention is related to regulators, and, in particular, to an apparatus and method for a boost regulator with soft-start for high-frequency pulse-width modulation of LED current.

BACKGROUND OF THE INVENTION

Light-emitting diodes (LEDs) may be used for lighting in portable electronics applications, and the like. It is often desirable to provide a mechanism for adjusting the brightness of the LED. According to a first approach, an LED may be driven with a DC voltage, and the DC voltage may be adjusted to adjust the brightness of the LED. According to a second approach, an LED may be driven with a high peak current having a low duty cycle, and the duty cycle of the current may be adjusted to adjust the brightness of the LED. The second approach consumes less power at a given level of brightness than the first approach.

White LEDs may be used for back-lighting applications. Typically, several white LEDs are coupled in series. A boost switching regulator may be employed to provide a voltage across the white LEDs.

BRIEF DESCRIPTION OF THE DRAWINGS

Non-limiting and non-exhaustive embodiments of the present invention are described with reference to the following drawings, in which.

DETAILED DESCRIPTION

Figure 1:
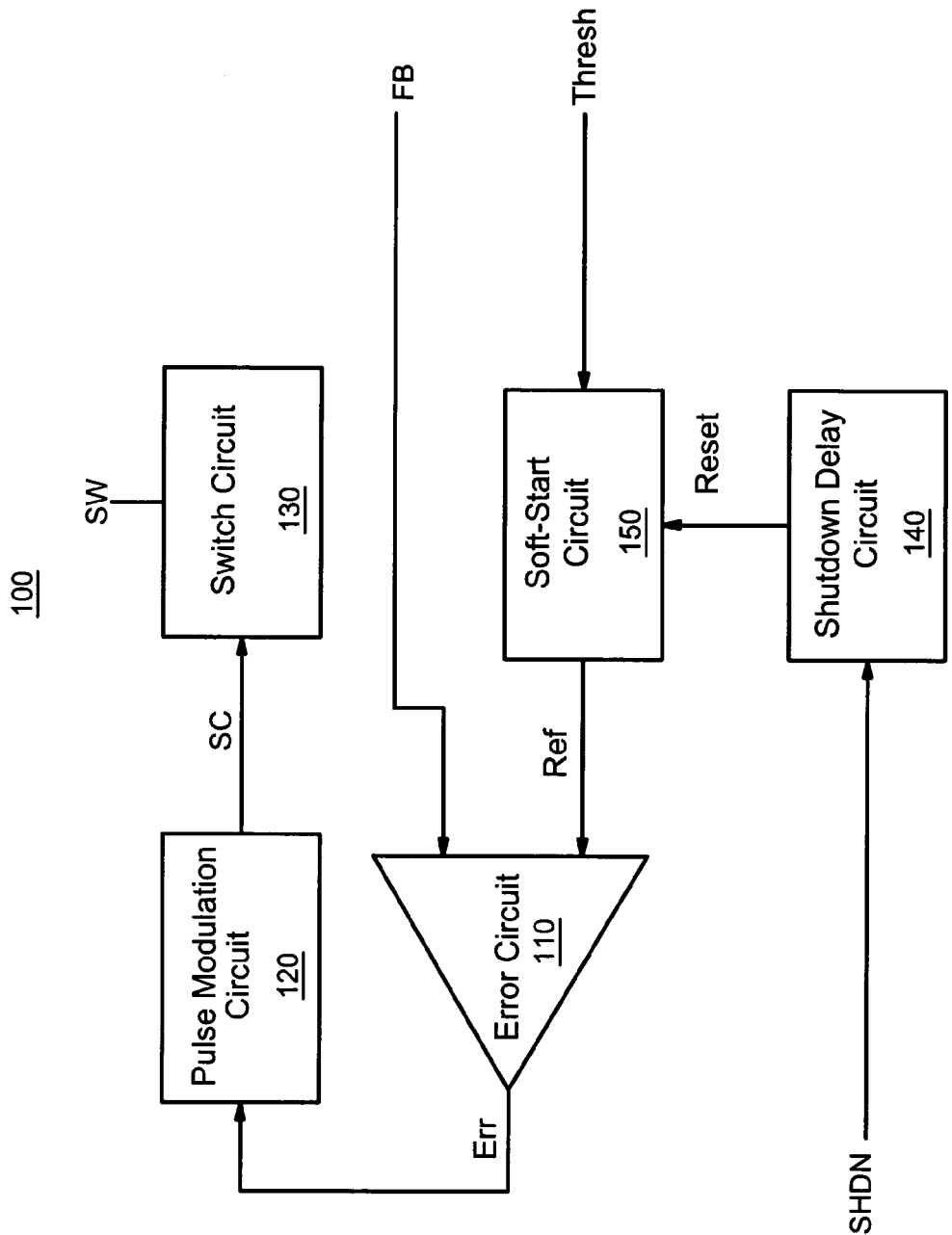
FIG. 1 shows a block diagram of an embodiment of a regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a boost regulator circuit with soft-start that is arranged for high-frequency pulse width modulation of LED current. When a shutdown signal is asserted, all circuitry in the boost regulator circuit is disabled, except for circuitry needed for a shutdown delay timer. Also, when the shutdown signal is asserted, the shutdown delay timer begins. If the shutdown signal is de-asserted before the shutdown delay timer expires, the boost regulator circuit resumes normal operation and soft-start is not employed. If the timer expires before the shutdown signal is de-asserted, a soft-start timer is reset, and the entire boost regulator circuit is disabled. When the shutdown signal is de-asserted after the soft-start timer is reset, soft-start is employed.

FIG. 1 shows a block diagram of an embodiment of regulator circuit 100, which may include error circuit 110, pulse modulation circuit 120, switch circuit 130, shutdown delay circuit 140, and soft-start circuit 150. In one embodiment, regulator circuit 100 is a current mode boost regulator. In another embodiment, regulator circuit 100 is a voltage mode boost regulator. In one embodiment, regulator circuit 100 is an asynchronous switching regulator that employs an external diode. In another embodiment, regulator circuit 110 is a synchronous switching regulator that employs a synchronous switch (not shown).

Error circuit 110 is arranged to provide error signal Err based on feedback signal FB and reference signal Ref. In one embodiment, regulator circuit 100 is a current regulator, and signal FB is a current sense signal that is based on a regulated output current. In another embodiment, regulator circuit 100 is a voltage regulator, and signal FB is a feedback voltage that is based on a regulated output voltage. In one embodiment, both current and voltage feedback may be employed in regulator circuit 100.

Pulse modulation circuit 120 is arranged to provide switch control signal SC such that a parameter of switch control signal SC is modulated based on signal Err. Also, pulse modulation circuit 120 may be arranged to provide signal SC such that signal SC is inactive if signal SHDN is active.

Switch circuit 130 is arranged to provide signal SW. Also, switch circuit 130 is configured to open and close based on the logic level of signal SC.

Soft-start circuit 150 is configured to enable soft-starting. In one embodiment, soft-start circuit 150 is configured to enable soft-starting of signal Ref such that, if a reference value associated with signal Ref is less than a threshold value that is associated with signal Thresh, the reference value increases until the reference value is substantially equal to the threshold value. The reference value is reset if signal Reset is asserted.

In one embodiment, shutdown delay circuit 150 includes a counter circuit and a digital-to-analog converter (DAC), as described below with regard to FIG. 8. In another embodiment, soft-start circuit 150 includes an analog timer including a current source and a capacitor, as described below with regard to FIG. 5. In yet another embodiment, soft-start circuit 150 provides current to an external capacitor to implement a timer.

Shutdown delay circuit 140 is configured to enable resetting of soft-start circuit 150 if signal SHDN is asserted for an amount of time that is greater that a timer delay td. In one embodiment, shutdown delay circuit 140 asserts signal Reset if signal SHDN is asserted for an amount of time that is greater than timer delay td. In another embodiment, shutdown delay circuit 140 asserts signal $T_2$ if signal SHDN is asserted for an amount of time that is greater that timer delay td, and other circuitry (not shown in FIG. 1) asserts signal Reset responsive to signal $T_2$.

In one embodiment, shutdown delay circuit 140 includes a digital timer circuit. In another embodiment, shutdown delay circuit 140 includes an analog timer including a current source and a capacitor, as described below with regard to FIG. 5. In yet another embodiment, shutdown delay circuit 140 provides current to an external capacitor to implement a timer.

Figure 2:
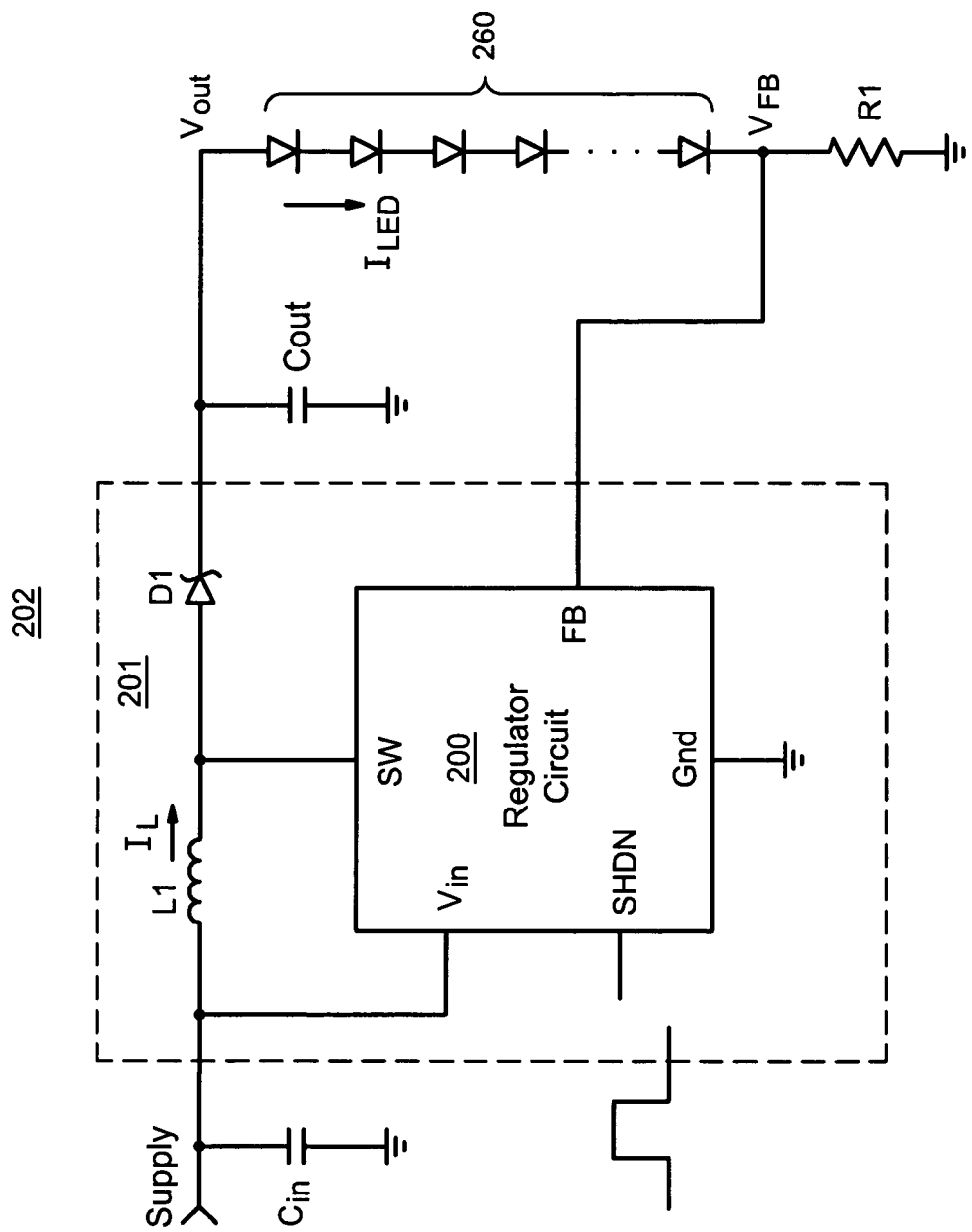
FIG. 2 illustrates a block diagram of an embodiment of an LED circuit that includes an embodiment of the regulator circuit of FIG. 1.

FIG. 2 illustrates a block diagram of an embodiment of LED circuit 202, which may include boost regulator 201, capacitors $C_{IN}$ and $C_{OUT}$, resistor R1, and LEDs 260. Boost regulator 201 may include inductor L1, diode D1, and regulator circuit 200. Regulator circuit 100 of FIG. 1 may be employed as an embodiment of regulator circuit 200. Boost regulator 201 is arranged to regulate an output signal. In one embodiment boost regulator 201 regulates output voltage $V_{out}$. In another embodiment, boost regulator 201 regulates current $I_{LED}$.

LEDs 260 are arranged to provide light with brightness that may be adjusted by adjusting the duty signal of signal SHDN. Further, LEDs 260 are coupled in series with voltage VOUT-VFB across LEDs 260. Boost regulator 201 enables the voltage across LEDs 260 to be greater than supply voltage VIN, which may be provided by a battery, and the like.

Additionally, regulator circuit 200 may be arranged to enter a low-current state if signal SHDN is asserted. Regulator circuit 200 may be further arranged to shut down completely if signal SHDN is asserted longer than delay time td. If signal SHDN is asserted for longer than delay time td, then when signal SHDN is re-asserted, LED current $I_{LED}$ and inductor current $I_L$ are soft-started. If signal SHDN is asserted for less than delay time td, then when signal SHDN is re-asserted, soft-start is not employed. This way, high-frequency pulse width modulation may be employed for LED current $I_{LED}$.

FIG. 2 illustrates an embodiment of boost regulator 201 in which boost regulator 201 is an asynchronous, inductive-based boost regulator. However, in other embodiments, boost regulator 201 may be synchronous or asynchronous, and may be inductive-based or switched capacitor-based. Also, as previously described, embodiments of boost regulator 201 may provide current regulation, voltage regulation, or both.

Figure 3:
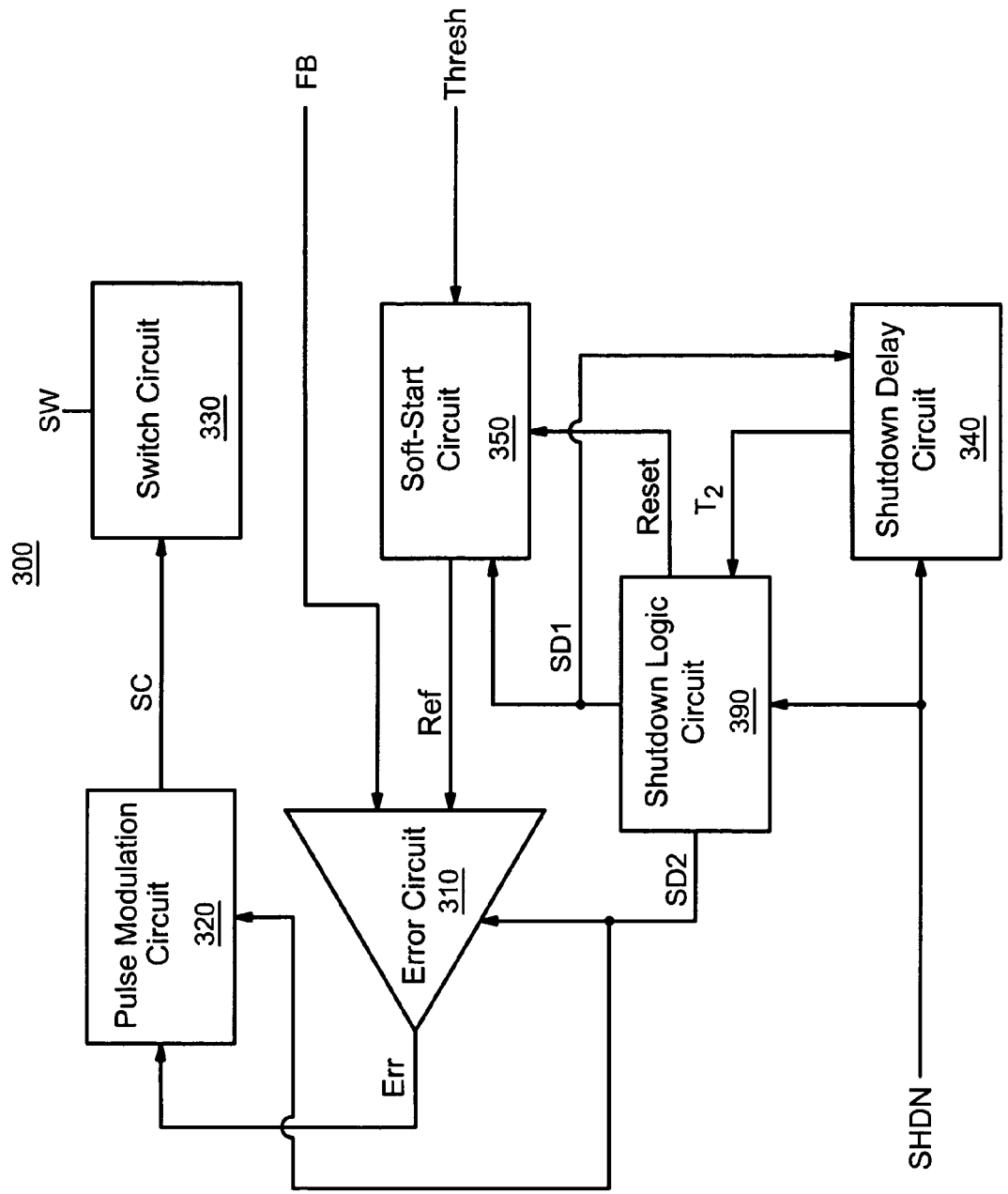
FIG. 3 shows a block diagram of an embodiment of the regulator circuit of FIG. 1 that includes a shutdown logic circuit.

FIG. 3 shows a block diagram of an embodiment of the regulator circuit 300. Components in regulator circuit 300 may operate in a substantially similar manner to similarly-named components in regulator circuit 100 of FIG. 1, and may operate in a different manner in some ways. Regulator circuit 300 further includes shutdown logic circuit 390.

In operation, shutdown delay circuit 340 asserts signal $T_2$ if signal SHDN is asserted for an amount of time that is greater that a timer delay td. Shutdown logic circuit 390 is arranged to provide signals SD1, SD2, and Reset based on signals SHDN and $T_2$. Shutdown logic circuit 390 is arranged to assert signal SD2 if signal SHDN is asserted. Also, shutdown logic circuit 390 is arranged to assert signals Reset and SD1 if signals SHDN and $T_2$ are asserted.

When signal SD2 is asserted, regulator circuit 300 enters a low-current mode to save power. In the low-current mode, substantially all components in regulator circuit 300, except for shutdown delay circuit 340 and any circuitry necessary for the proper operation of shutdown delay circuit 340, are disabled. If signal SD2 is asserted and signal SD1 remains unasserted, shutdown delay circuit 340 remains enabled. In one embodiment, shutdown delay circuit 340 and soft-start circuit 350 share circuitry, and soft-start circuit 350 remains enabled when shutdown delay circuit 340 is enabled. Also, in one embodiment, a bandgap reference circuit, a bias circuit, and an oscillator (not shown) remain enabled when signal SD2 is asserted and signal SD1 is unasserted.

When signal SD1 is asserted, regulator circuit 300 is fully shut down.

In the embodiment illustrated in FIG. 3, pulse modulation circuit 320 and error circuit 310 are enabled and disabled responsive to signal SD2, and soft-start circuit 350 and shutdown delay circuit 340 are enabled and disabled responsive to signal SD1.

Figure 4:
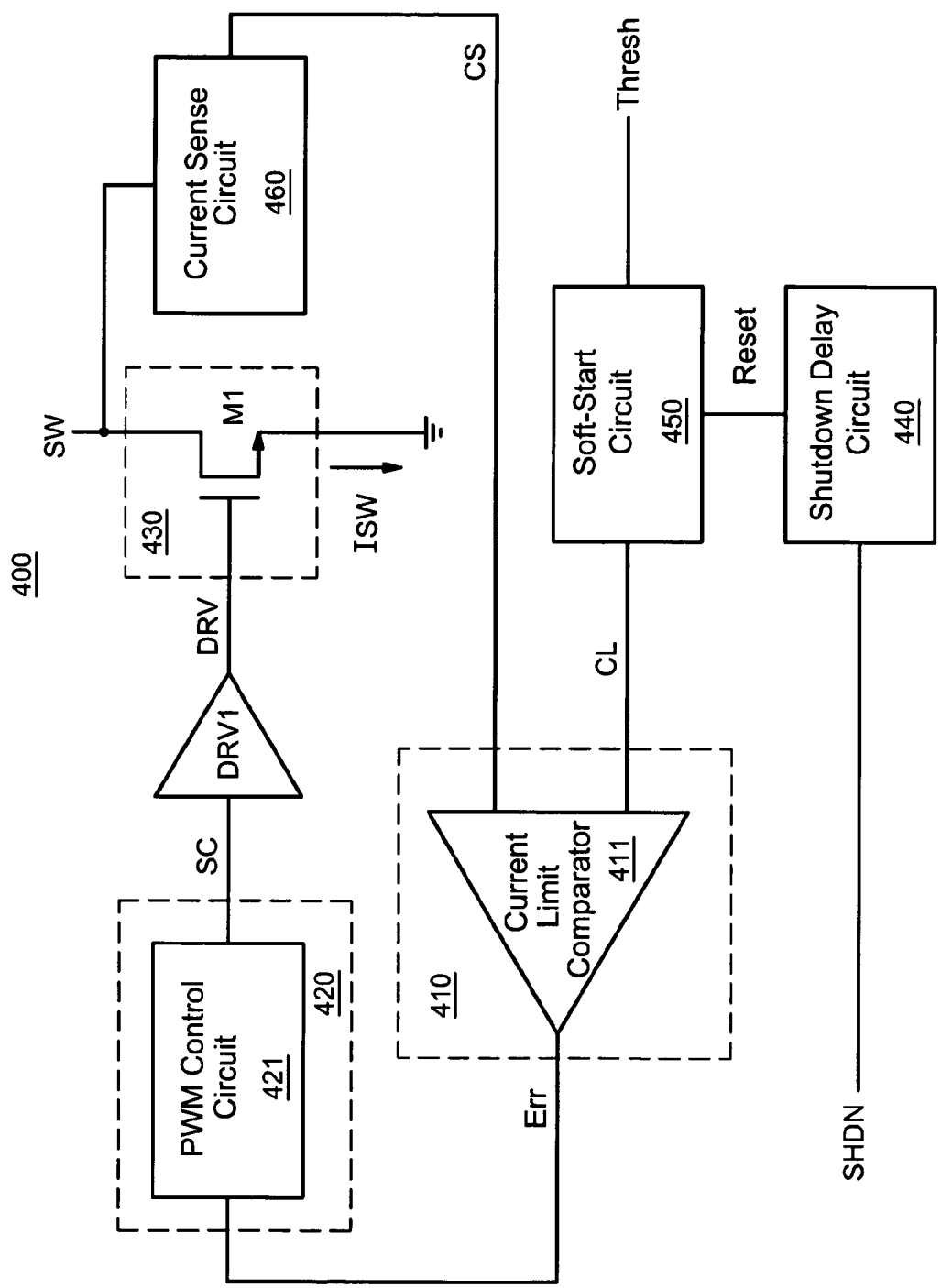
FIG. 4 illustrates a block diagram of an embodiment of the regulator circuit of FIG. 1 that employs current regulation.

FIG. 4 illustrates a block diagram of an embodiment of regulator circuit 400. Regulator circuit 400 is a current mode boost regulator. Components in regulator circuit 400 may operate in a similar manner to similarly-named components in regulator circuit 100, and may operate in a different manner in some ways. Error circuit 410 includes current limit comparator 411. Feedback signal FB includes current sense signal CS. Reference signal Ref includes current limit signal CL. Additionally, pulse modulation circuit 420 includes PWM control circuit 421. Switch circuit 430 includes transistor M1. Also, regulator circuit 400 further includes driver DRV1 and current sense circuit 460.

Current sense circuit 460 is arranged to sense current ISW, where current ISW is the current across transistor M1. Current sense circuit 460 may be further arranged to provide current sense signal CS such that current sense signal CS is substantially equal to current ISW times an on-resistance associated with transistor M1.

Additionally, current limit comparator circuit 411 is arranged to provide signal Err such that the logic level of signal Err is based on a comparison of current sense signal CS and current limit signal CL. PWM control circuit 421 is arranged to modulate the duty cycle of signal SC based on signal Err. Also, driver DRV1 is arranged to provide signal DRV based on signal SC for driving transistor M1.

Figure 5:
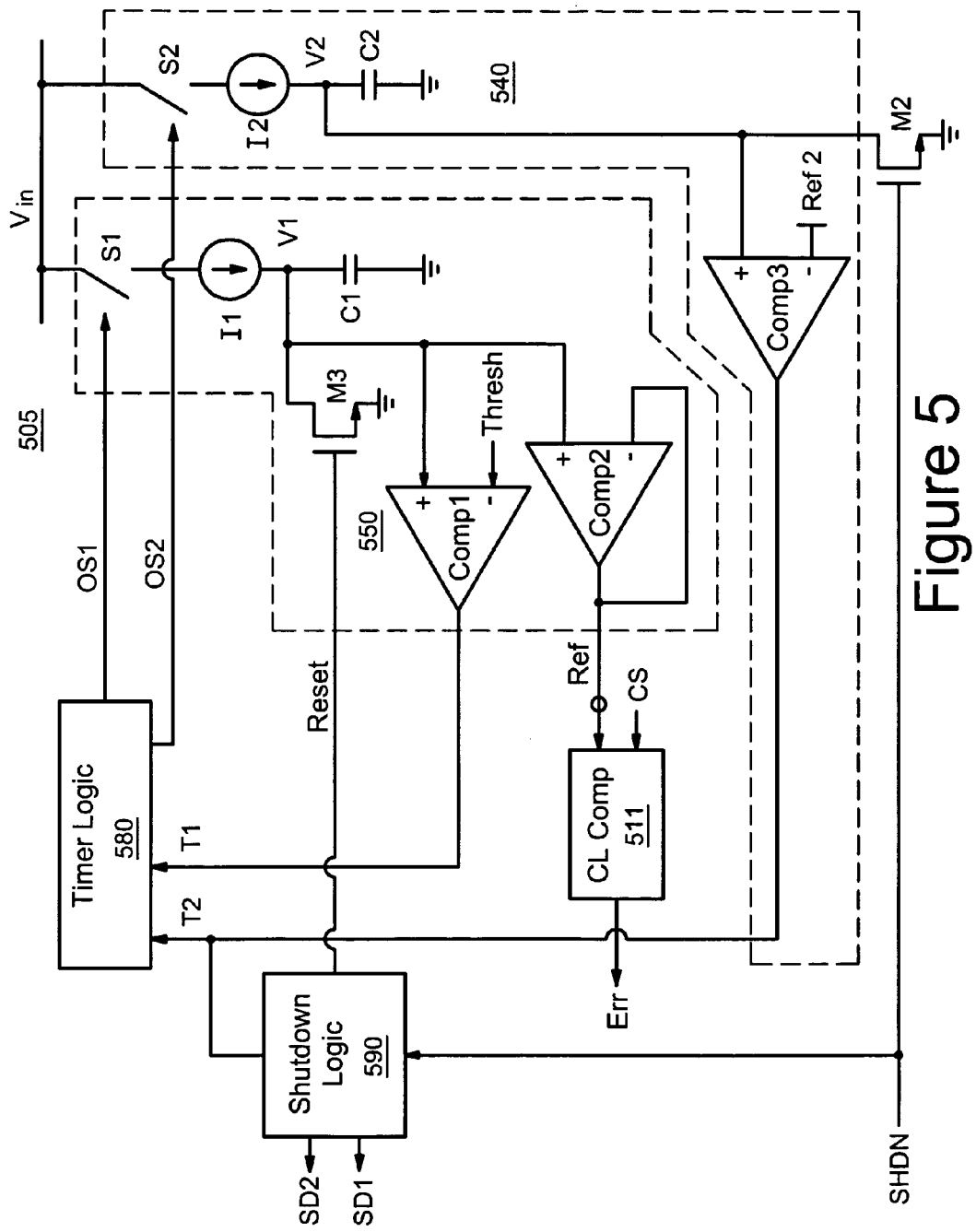
FIG. 5 shows a block diagram of a portion of an embodiment of the regulator circuit of FIG. 4 in which embodiments of the shutdown delay circuit and the soft-start circuit are shown in greater detail.

FIG. 5 shows a block diagram of portion 505 of an embodiment of regulator circuit 500, where embodiments of the shutdown delay circuit and the soft-start circuit are shown in greater detail. Portion 505 includes timer logic 580, current limit comparator 511, shutdown logic 590, shutdown delay circuit 540, soft-start circuit 550, and transistor M2. Shutdown delay circuit 540 includes current source I2, capacitor C2, and comparator circuit Comp3. Soft-start circuit 550 includes comparator circuits Comp1 and Comp2, current source I1, capacitor C1, and transistor M3.

In operation, timer logic circuit 580 provide signals $OS_1$ based, in part, on signal $T_1$, and provides signal $OS_2$ based, in part, on signal $T_2$. In one embodiment, a high pulse is provided in signal $OS_1$ if signal $T_1$ changes to a logic high, and a high pulse is provided in signal $OS_2$ if signal $T_2$ is changed to a logic high.

Also, switch circuit S1 is arranged to open and close responsive to signal $OS_1$, and switch circuit S2 is arranged to open and close responsive to signal $OS_2$. Further, switch circuit S1 is arranged to provide current from current source I1 to capacitor C1 if the soft-start switch is closed, such that voltage V1 ramps upward if switch circuit S1 is closed. Similarly, switch circuit S2 is arranged to provide current from current source I2 to capacitor C2 if the shutdown delay switch is closed, such that voltage V2 ramps upward if switch circuit S2 is closed.

Comparator circuit Comp1 is arranged to compare voltage V1 with signal Thresh and to provide signal $T_1$ in response to the comparison. Similarly, comparator circuit Comp3 is arranged to compare voltage V2 to reference signal Ref2, and to provide signal $T_2$ based on the comparison. Comparator circuit Comp2 is arranged to operate as a buffer.

Additionally, transistor M3 is arranged to discharge capacitor C1 if signal Reset is asserted. Transistor M2 is arranged to operate as a switch that opens if signal SHDN is asserted.

Figure 6:
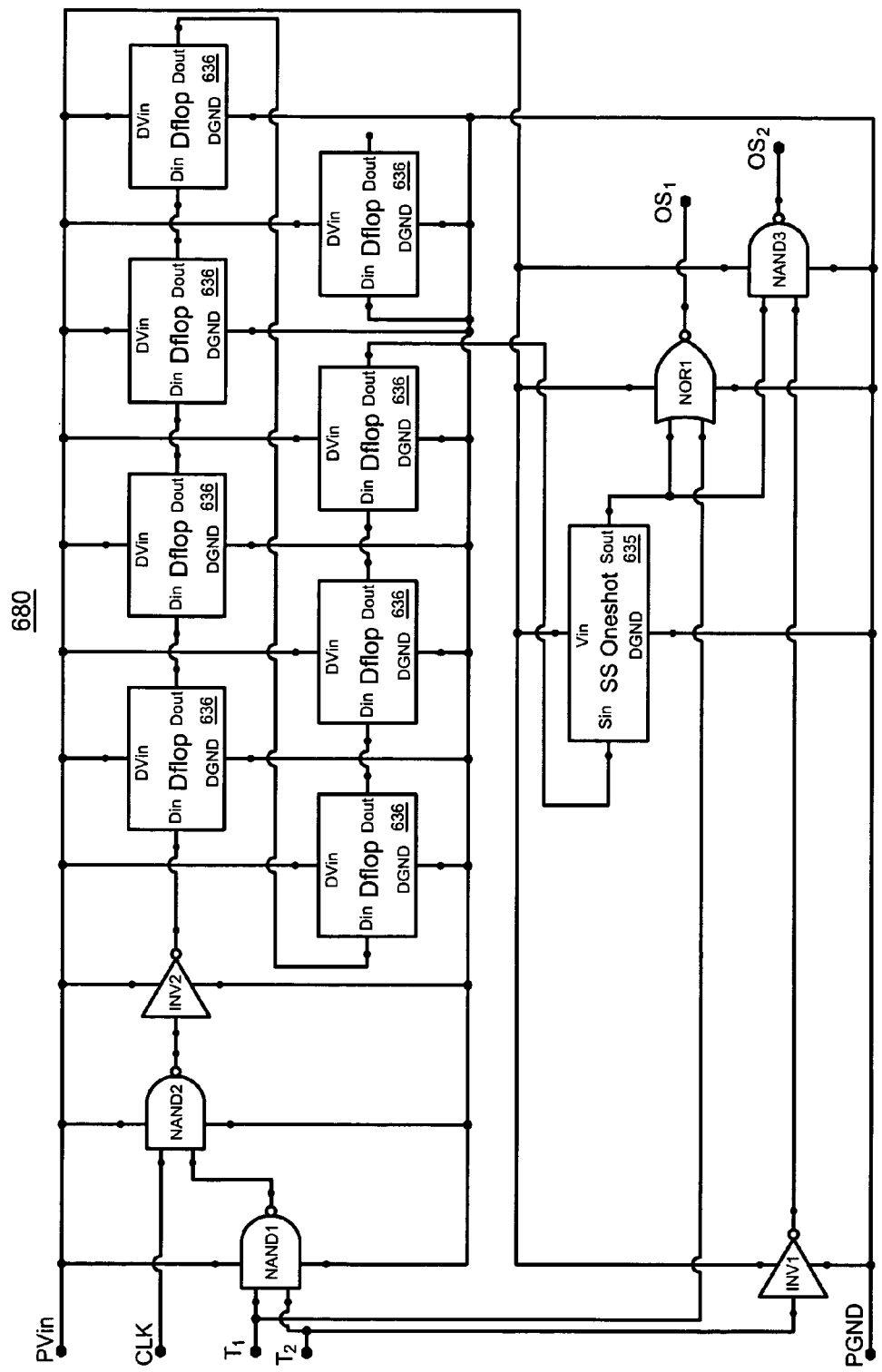
FIG. 6 illustrates a block diagram of an embodiment of the timer logic circuit of FIG. 5.

FIG. 6 illustrates a block diagram of an embodiment of timer logic circuit 680. Timer logic circuit 680 may operate in a substantially similar manner as timer logic circuit 580 of FIG. 5, and may operate in a different manner in some ways. Timer logic circuit 580 includes NAND gates NAND1–3, inverters INV1–INV2, NOR gate NOR1, one-shot timer 635, and flip-flops 636.

Figure 7:
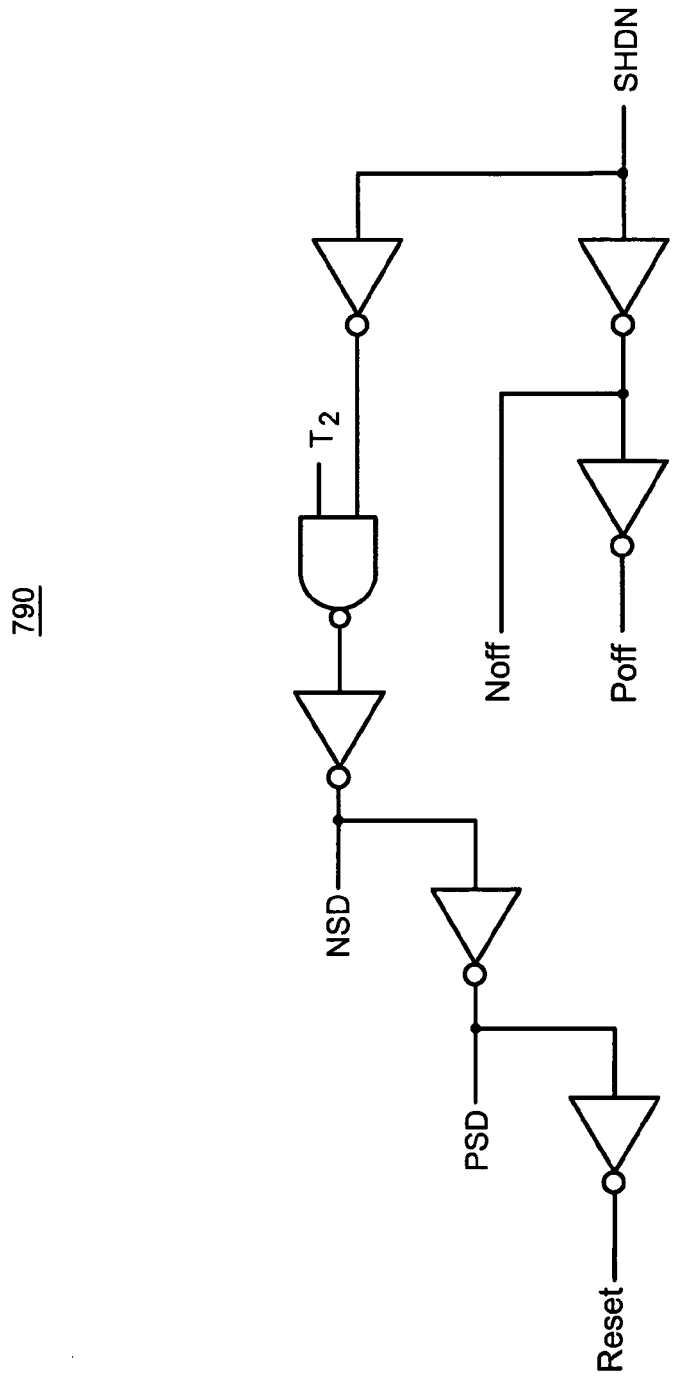
FIG. 7 shows a diagram of an embodiment of the shutdown logic circuit of FIGS. 3 and 5.

FIG. 7 shows a diagram of an embodiment of shutdown logic circuit 790. Shutdown logic circuit 790 may operate in a substantially similar manner to shutdown logic circuit 390 of FIG. 3 and shutdown logic circuit 590 of FIG. 5, and may operate in a different manner in some ways. Signal SD2 may include signals Noff and Poff. Signal SD1 may include signals NSD and PSD.

In the embodiment shown, signal SHDN is an active low signal. Shutdown logic circuit 790 provides signals Noff and Poff based on signal SHDN. When signal SHDN is asserted (e.g. changes to logic low), signal Noff changes to a high logic level, and signal Poff changes to a low logic level. Signal Noff may be provided to the gate of n-type transistors, and signal Poff may be provided to the gate of p-type transistors.

When signal $T_2$ and SHDN are both asserted, signals NSD and Reset both change to a high logic level, and signal PSD changes to a low logic level. Signal NSD may be provided to the gate of n-type transistors, and signal PSD may be provided to the gate of p-type transistors.

Figure 8:
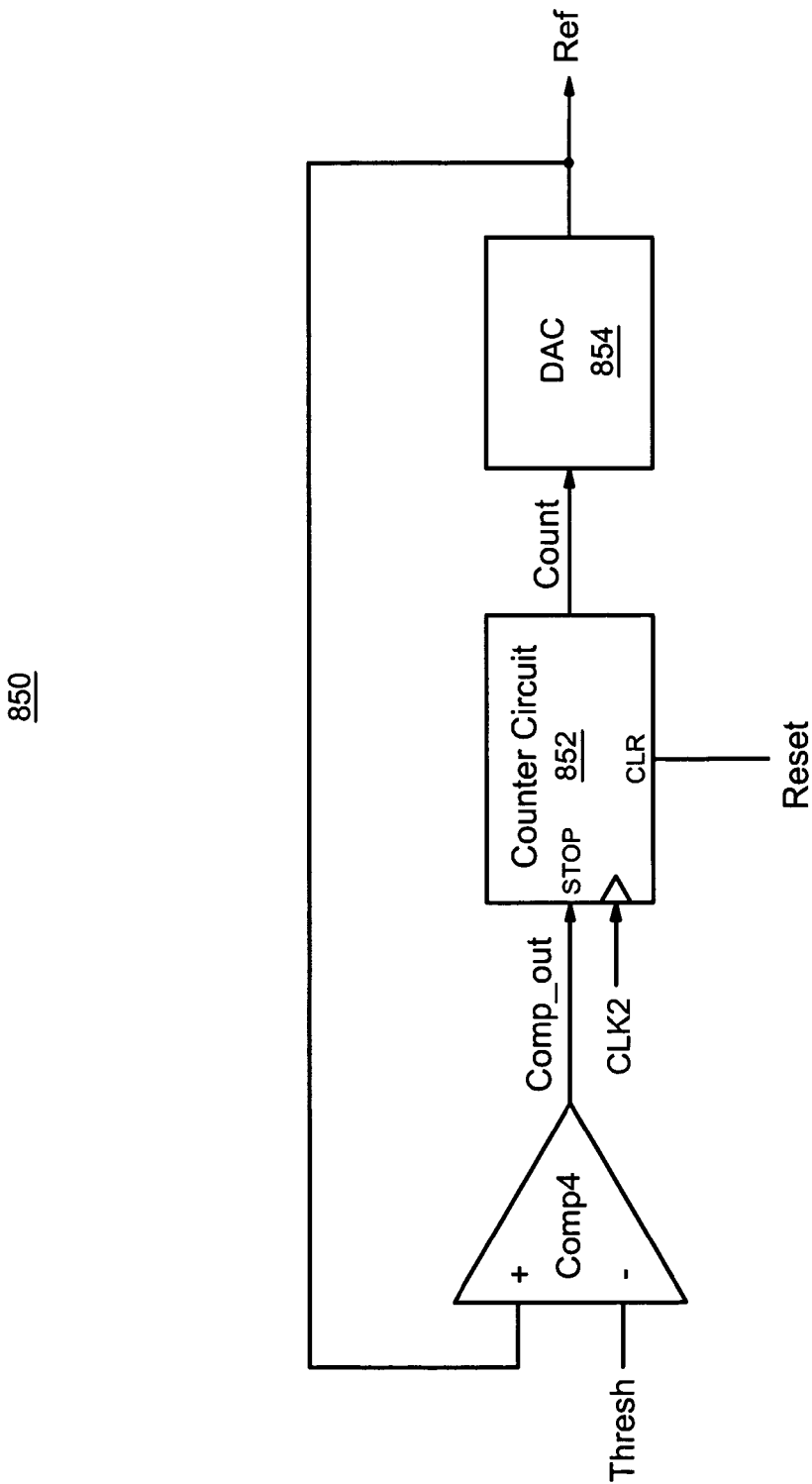
FIG. 8 illustrates a block diagram of another embodiment of the soft-start circuit of FIG. 1, arranged in accordance with aspects of the invention.

FIG. 8 illustrates a block diagram of an embodiment of soft-start circuit 850. Soft-start circuit 850 may operate in a substantially similar manner as soft-start circuit 150 of FIG. 1, and may operate in a different manner in some ways. Soft-start circuit 850 includes counter circuit 852, DAC 854, and comparator circuit Comp4.

In operation, comparator circuit Comp4 compares signals Ref and Thresh, and provides signal Comp_out in response to the comparison. If the reference value is less than the threshold value, signal Comp_out corresponds to a first logic level, and if the reference value is greater than the threshold value, signal Comp_out corresponds to a second logic level.

Also, counter circuit 852 is arranged to increment a count value if a triggering edge of signal CLK2 is received and signal $Comp_{13}$ out corresponds to the first logic level. Further, counter circuit 852 is arranged to reset the count value (e.g. to zero) if signal Reset is asserted. Counter circuit 852 is also arranged to provide signal Count such that signal Count corresponds to the count value. Also, DAC 854 is arranged to perform an analog-to-digital conversion to provide signal Ref from signal Count.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulating an output signal, comprising:
an error circuit that is arranged to provide an error signal based, in part, on a feedback signal and a reference value of a reference signal;
a pulse modulation circuit that is arranged to provide a switch control signal such that a modulation parameter of the switch control signal is modulated based, in part, on the error signal; and such that the switch control signal corresponds to an inactive level if a shutdown signal is asserted;
a switch circuit that is arranged to enable the output signal to be regulated based, in part, on the switch control signal;
a shutdown delay circuit that is configured to enable assertion of a reset signal if the shutdown timer is asserted for an amount of time that is greater than a pre-determined shutdown delay time; and
a soft-start circuit that is configured to enable soft-starting of the reference signal such that, if the reference value is less than a threshold value, the reference value increases until the reference value is substantially equal to the threshold value; and such that the reference value is reset to a reset value if the reset signal is asserted.

2. The circuit of claim 1, wherein the error circuit includes a current limit comparator circuit; and wherein the feedback signal includes a current sense signal that is based on a sensed current that is based, in part, on the output signal.

3. The circuit of claim 1, wherein the feedback signal includes a feedback voltage that is based on a voltage that is associated with the output signal.

4. The circuit of claim 1, wherein the pulse modulation circuit includes one of a pulse width modulation control circuit and a pulse frequency modulation control circuit.

5. The circuit of claim 1, wherein the shutdown delay circuit includes a digital timer circuit.

6. The circuit of claim 1, wherein the shutdown delay circuit includes:
a shutdown delay capacitor;
a current source that is configured to provide a shutdown delay current;
a shutdown delay switch circuit that is coupled between the current source circuit and a shutdown delay node, wherein the shutdown delay switch circuit is configured to open and close responsive to a shutdown delay switch control signal, and wherein the shutdown delay switch circuit is arranged to provide the shutdown delay current to the shutdown delay capacitor if the shutdown delay switch is closed, such that a shutdown delay voltage at the shutdown delay node ramps upwards if the shutdown delay switch circuit is closed;
a shutdown delay comparator circuit that is arranged to provide a shutdown delay comparator voltage based on a comparison between the shutdown delay voltage and a shutdown delay reference voltage; and a shutdown delay logic circuit that is arranged to provide the shutdown delay switch control signal based, in part, on the shutdown delay comparator voltage.

7. The circuit of claim 1, wherein the shutdown delay circuit includes:
a current source that is configured to provide a shutdown delay current;
a shutdown delay switch circuit that is coupled between the current source circuit and a shutdown delay node, wherein the shutdown delay switch circuit is configured to open and close responsive to a shutdown delay switch control signal, and wherein the shutdown delay switch circuit is arranged to provide the shutdown delay current to a shutdown delay capacitor if the shutdown delay switch is closed, such that a shutdown delay voltage at the shutdown delay node ramps upwards if the shutdown delay switch circuit is closed;
a shutdown delay comparator circuit that is arranged to provide a shutdown delay comparator voltage based on a comparison between the shutdown delay voltage and a shutdown delay reference voltage; and
a shutdown delay logic circuit that is arranged to provide the shutdown delay switch control signal based, in part, on the shutdown delay comparator voltage.

8. The circuit of claim 1, wherein the soft-start circuit includes:
a counter circuit that is configured to provide a count value, wherein the counter circuit is arranged to increment the count value responsive to a clock signal until the count value is equal to the threshold value, and further arranged to reset the count value if the reset signal is asserted; and
a digital-to-analog converter that is arranged to provide the reference signal from the count value.

9. The circuit of claim 1, wherein the soft-start circuit includes:
a soft-start capacitor circuit;
a current source that is configured to provide a soft-start current;
a soft-start switch circuit that is coupled between the current source circuit and a soft-start node, wherein the soft-start switch circuit is configured to open and close responsive to a soft-start switch control signal, and wherein the soft-start switch circuit is arranged to provide the soft-start current to the soft-start capacitor if the soft-start switch is closed, such that a soft-start voltage at the soft-start node ramps upwards if the soft-start switch circuit is closed;
a soft-start comparator circuit that is arranged to provide a soft-start comparator voltage based on a comparison between the soft-start voltage and a soft-start reference voltage;
a soft-start logic circuit that is arranged to provide the soft-start switch control signal based, in part, on the soft-start comparator voltage; and
a reset switch circuit that is coupled in parallel with the soft-start capacitor circuit, wherein the reset switch circuit is configured to open and close responsive to the reset signal.

10. The circuit of claim 1, wherein the soft-start circuit includes:
a current source that is configured to provide a soft-start current;
a soft-start switch circuit that is coupled between the current source circuit and a soft-start node, wherein the soft-start switch circuit is configured to open and close responsive to a soft-start switch control signal, and wherein the soft-start switch circuit is arranged to provide the soft-start current to a soft-start capacitor if the soft-start switch is closed, such that a soft-start voltage at the soft-start node ramps upwards if the soft-start switch circuit is closed;
a soft-start comparator circuit that is arranged to provide a soft-start comparator voltage based on a comparison between the soft-start voltage and a soft-start reference voltage;
a soft-start logic circuit that is arranged to provide the soft-start switch control signal based, in part, on the soft-start comparator voltage; and
a reset switch circuit that is configured to open and close responsive the reset signal, and arranged such that the soft-start capacitor is discharged if the reset signal is asserted.

11. The circuit of claim 1, wherein the error circuit is arranged such that the error circuit is disabled if the shutdown signal is asserted, and wherein the shutdown delay circuit is arranged such that the error circuit is enabled if the shutdown signal is asserted and the reset signal is unasserted.

12. The circuit of claim 11, wherein the shutdown delay circuit is further arranged such that the shutdown delay circuit is disabled if the reset signal is asserted, and wherein the pulse modulation circuit is further arranged such that the pulse modulation circuit is disabled if the shutdown signal is asserted.

13. A method for regulating an output signal, comprising:
providing an error signal based, in part, on a feedback signal and a reference value of a reference signal;
providing a switch control signal such that a modulation parameter of the switch control signal is modulated based, in part, on the error signal; and such that the switch control signal corresponds to an inactive level if a shutdown signal is asserted;
opening and closing a switch circuit responsive to the switch control signal;
asserting a reset signal if the shutdown signal is asserted for an amount of time that is greater than a pre-determined shutdown delay time;
soft-starting the reference signal such that, if the reference value is less than a threshold value, the threshold value increases until the reference value is substantially equal to the threshold value; and
reducing the reference value to a reset value if the reset signal is asserted.

14. The method of claim 13, further comprising:
sensing a current that is based, in part, on the output signal; and
providing the feedback signal based, in part, on the sensed current.

15. The method of claim 13, wherein providing the error signal includes:
comparing the feedback signal with the reference signal; and
providing the error signal based on the comparison.

16. The method of claim 13, wherein the modulation parameter of the switch control signal includes at least one of a frequency and a duty cycle of the switch control signal.

17. The method of claim 13, further comprising:
if the shutdown signal is asserted, entering a low-current mode; and
if the shutdown signal is asserted for an amount of time that is greater than the pre-determined shutdown delay time, entering a complete shutdown mode.

18. The method of claim 13, wherein soft-starting the circuit includes:
   providing a soft-start voltage at a soft-start node, wherein a soft-start capacitor is coupled to the soft-start node;
   comparing a soft-start voltage to a soft-start reference voltage;
   providing a soft-start control signal, based, in part, on the comparison; and
   providing a soft-start current to the soft-start capacitor if the soft-start control signal is asserted.

19. The method of claim 18, wherein reducing the reference value to the reset value includes discharging the soft-start capacitor.

20. An apparatus for regulating an output signal, comprising:
   means for providing an error signal based, in part, on a feedback signal and a reference value of a reference signal;
   means for providing a switch control signal such that a modulation parameter of the switch control signal is modulated based, in part, on the error signal; and such that the switch control signal corresponds to an inactive level if a shutdown signal is asserted;
   means for opening and closing a switch circuit responsive to the switch control signal;
   means for asserting a reset signal if the shutdown timer is asserted for an amount of time that is greater than a pre-determined shutdown delay time;
   means for soft-starting the reference signal such that, if the reference value is less than a threshold value, the threshold value increases until the reference value is substantially equal to the threshold value; and
   means for reducing the reference value to a reset value if the reset signal is asserted.

* * * * *

UNITED STATES PATENT AND TRADEMARK OFFICE
CERTIFICATE OF CORRECTION

PATENT NO.         : 7,106,036 B1
APPLICATION NO. : 10/881855
DATED                 : September 12, 2006
INVENTOR(S)       : Michael John Collins It is certified that error appears in the above-identified patent and that said Letters Patent is hereby corrected as shown below:

Column 5, Line 65, Delete "$Comp_{13}out$" and insert -- Comp_out --.

Signed and Sealed this

Second Day of January, 2007

JON W. DUDAS
*Director of the United States Patent and Trademark Office*